United States Patent [19]

Whetzel et al.

[11] 3,888,739

[45] June 10, 1975

[54] REAGENTS AND METHODS FOR DETERMINING AMYLASE CONCENTRATIONS

[75] Inventors: Lawrence C. Whetzel, Irvine; Margaret E. Townsend, Tustin, both of Calif.

[73] Assignee: Bio-Reagents & Diagnostics, Inc., Irvine, Calif.

[22] Filed: May 7, 1973

[21] Appl. No.: 357,905

[52] U.S. Cl. ............................ 195/99; 195/103.5 R
[51] Int. Cl. ............................................. G01n 33/00
[58] Field of Search .................................. 195/103.5

[56] References Cited
UNITED STATES PATENTS
3,597,322   8/1971   Babson ........................ 195/103.5 R

OTHER PUBLICATIONS

Huggins, et al., "Colorimetric Determination of Amylase," *Annals of Surgery*, Vol. 128, (1948), p. 668–678.

Fried, et al., "Determination of α-Amylase in Serum and Urine," Chem. Abstracts, Vol. 63, 4575g. (1965).

*Primary Examiner*—A. Louis Monacell
*Assistant Examiner*—Esther L. Massune
*Attorney, Agent, or Firm*—Harris, Kern, Wallen & Tinsley

[57] ABSTRACT

The new reagents for determining amylase concentrations in specimens of human fluids are a novel starch solution and a novel iodine solution. The starch solution is generally comprised of a starch that will readily dissolve in water, a buffer, a chloride salt, and an excipient. The starch solution has a pH of about 7 and is preferably freeze dried to prevent deterioration and provide for a long and stable shelf life. The aqueous iodine solution is generally comprised of iodine, and an iodate and/or an iodide salt or combination thereof, and an acid to provide the solution with a pH of about 2 to 3.

The new method for determining amylase concentrations in specimens of human fluid utilizes the aforesaid novel starch and iodine solutions and is generally comprised of the following steps. A specimen having an unknown amylase concentration is incubated at a specified temperature in the novel starch solution. After a specified time, the iodine solution is admixed with the starch solution containing the specimen to stop the reaction between the enzyme and the starch. Another portion of the iodine solution is admixed into another starch solution without the presence of any specimen therein. The optical density of the starch-iodine solution containing the specimen is compared against the optical density of the starch-iodine solution without the specimen. The difference in optical densities is used as a relative measure of how much starch has been hydrolyzed by the amylase which is a function of the amylase concentration of the specimen.

4 Claims, No Drawings

REAGENTS AND METHODS FOR DETERMINING AMYLASE CONCENTRATIONS

BACKGROUND OF THE INVENTION

Alpha amylase, hereinafter referred to as amylase, is an enzyme produced by the human body and is found in fluids such as blood, urine and saliva. It is not entirely certain what part of the body produces amylase, but it is clear that when the body is healthy, the concentration of amylase present in human fluids will vary within normal levels, and when the body is suffering from certain pathological conditions the amylase concentration will be higher or lower than normal levels. When a person has pancreatitis, mumps, or cancer of the pancreas, the amylase concentration will be much greater than its normal level. Liver diseases may produce amylase concentrations that are lower than normal levels.

Techniques for determining amylase concentrations generally all involve the use of starch because of the catalytic effect of alpha amylase on the hydrolysis of the 1,4 and 1,6 linkages of the amylose and amylopectin fractions of starch. If this hydrolysis is left to go to completion, the amylase will progressively degrade the starch into maltose and small amounts of glucose. Certain techniques have attempted to correlate the decrease in the turbidity or viscosity of an aqueous starch solution after amylose hydrolysis with the resultant amylase concentration.

Other techniques measure the reducing substances produced by the amylase-starch reaction as a measure of amylase concentration. Other techniques utilize a dyed starch and measure the optical density of the dye that is split off from the starch during the amylase-starch reaction as a measure of amylase concentration.

Another technique, which is the subject of the present invention, is the iodometric method which utilizes the well known reaction between iodine and starch to form a blue color. When a blue colored starch-iodine solution is hydrolyzed with amylase, the blue color changes to violet to amber to red to colorless as the amylase degrades the starch. The change in color of the blue starch-iodine solution is thus some measure of amylase concentration. This technique, however, has not been considered reliable or sufficiently definite because it is believed that the change in color does not bear a linear relationship to the concentration of amylase. The iodometric technique is further believed to be unreliable because the blue color complex formed by the iodine-starch reaction is generally unstable and is effected by temperature and the presence of nonspecific substances in human fluids which react with the starch-iodine color complex. It has further been thought that an accurate correlation between color change and amylase concentrations cannot be achieved because as the amylase degrades the starch, suboptimum levels of starch will be present which may result in some variation or unreliability of the resultant color as a measure of amylase concentration.

All of the foregoing techniques, while sufficient to yield a general indication of amylase concentration, are generally not satisfactory for use in clinical laboratories because they either do not lend themselves to precise scientific measurements, cannot be standardized to yield reproducible results, or are too complex and time-consuming. The need for a quick, simple, precise, and reliable technique for determining amylase concentration, which the prior art has failed to produce, is particularly acute in hospital laboratories where the life or death of a patient can be determined by how quickly and accurately the patient's amylase concentration can be determined.

SUMMARY OF THE INVENTION

It is therefore an object of the present invention to provide a new set of reagents and a new method for using these reagents which will overcome the problems associated with prior techniques for determining amylase concentrations.

Another object of the present invention is to provide a new procedure for determining amylase concentrations which can be performed quickly, simply, and with reproducible, reliable results.

These objects are achieved by the invention disclosed and claimed hereinafter which is a new and improved iodometric technique that has proven to be successful despite the prejudice of the prior art against this approach.

The iodometric technique of the present invention uses a novel set of starch and iodine reagents. The starch reagent, which is also referred to as the enzyme substrate, is an aqueous solution of the amylose fraction of starch which will readily dissolve in water, a buffer, a chloride salt, and an excipient. The starch solution has a pH of about 7 and is preferably freeze dried to prevent deterioration and provide for a long and stable shelf life. The iodine reagent is an aqueous solution of iodine, and iodate salt and/or an iodide salt or combination thereof, and an acid to provide the solution with a pH of about 2 to 3.

The new method of the present invention utilizes the aforesaid novel starch and iodine solutions and is generally comprised of the following steps. A specimen having an unknown amylase concentration is incubated at a specified temperature in the novel starch solution. After a specified time, the iodine solution is admixed with the starch solution containing the specimen to stop the enzyme reaction. Another portion of the iodine solution is admixed into another portion of starch solution without the presence of any specimen therein. The optical density of the starch-iodine solution containing the specimen is compared against the optical density of the starch-iodine solution without the specimen. The difference in optical densities is used as a relative measure of how much amylose is reacted with amylase which is a function of the amylase concentration of the specimen.

EMBODIMENTS OF THE INVENTION

In a preferred embodiment of the present invention, the starch reagent is prepared by dissolving the following in one liter of distilled water at room temperature: 0.225 grams of Superlose 500, which functions as a starch substrate, 5.36 grams of hydrated disodium hydrogen phosphate ($Na_2HPO_4 \cdot 7H_2O$), and 2.72 grams of potassium dihydrogen phosphate ($KH_2PO_4$) to provide a buffer for the solution, 1.17 grams of sodium chloride (0.020M) and 10 grams of mannitol as an excipient. The particular weights of each phosphate as aforesaid are calculated to provide a 0.025 molar solution of each phosphate having a pH of between 6–8.

The final pH of the starch solution is adjusted, if need be, to a pH of 7.0 with an appropriate amount of sulfuric acid or sodium hydroxide. The resultant starch solution is filtered through a 0.22 micron member filter under sterile conditions to remove any contaminants and particulate matter. The filtered starch solution as aforesaid is freeze dried by conventional techniques until there is less than 1 percent of moisture remaining in the residue which is maintained under a nitrogen atmosphere to prevent contamination by air which might otherwise result in deterioration of the freeze dried material and reduce its shelf life.

The aqueous iodine reagent is comprised of a 0.002N solution of iodine, a 0.9N solution of hydrochloric acid (HCl), and 0.1 grams per liter of potassium iodide (KI) and 0.1 grams per liter of potassium iodate ($KIO_3$) to assist in stabilizing and solubilizing the iodine. Distilled water is used to prepare the iodine reagent to avoid the presence of any contaminants. The pH of the final solution is adjusted, if need be, to a pH of 2 to 3 using hydrochloric acid or sodium hydroxide.

The preferred method for determining amylase concentrations comprises the following steps. The freeze dried amylose substrate is reconstituted with any suitable amount of distilled water. Two milliliters of the starch reagent are measured into each of two separate test tubes and maintained at 37°C. Twenty-five microliters of a human fluid specimen containing an unknown concentration of amylase are admixed into one of the test tubes and incubated at 37°C. After five minutes of incubation, one milliliter of the iodine solution is admixed with the starch solution containing the specimen. The high acidity and the iodine present in the solution (pH of 2 to 3) terminates the hydrolysis of the amylose and stabilizes the resultant blue-colored iodine complex. One milliliter of the iodine solution is admixed with the test tube containing the amylose solution only and not containing any specimen, hereinafter referred to as the blank. Ten milliliters of distilled water are added to each test tube to dilute the intense blue color of the solution in each test tube so the optical densities thereof are more susceptible to an accurate determination.

The optical density (OD) of the solution in the test tubes containing the specimen and the blank are measured in a spectrophotometer initially set at 0 optical density and 620 nanometers (nm) with water. The difference in optical densities is calculated and divided by the optical density of the blank and multiplied by 1,000 to give a figure which expresses the units of amylase per 100 milliliters of specimen. Serum specimens taken from healthy individuals will have amylase concentrations ranging from 40 to 150 units per 100 milliliters of specimen as measured by the aforesaid method. By noting the amylase units determined for any particular specimen and comparing it against the 40 to 150 range found to exist in healthy individuals, a relative measure of the amount of serum amylase in a particular specimen and the degree of pathology of a particular individual can be quickly determined.

The entire method as described aforesaid, starting from the time the freeze dried starch is reconstituted until the amylase concentration is determined, is performed in about 15 minutes.

The optical densities of six different specimens, their corresponding blanks, and the calculated units of amylase per 100 ml. of specimen are set forth hereinbelow in Table I. A number of runs were made for each specimen to demonstrate the high degree of reproducibility and linearity of the test results.

TABLE I

| Specimen Number | Run No. | O.D. of the Blank | O.D. of the Specimen | Units of amylase per 100 ml. of Specimen |
|---|---|---|---|---|
| 1 | 1. | 790 | 407 | 484 |
|   | 2. | 791 | 403 | 491 |
|   | 3. | 790 | 408 | 484 |
| 2 | 1. | 798 | 486 | 390 |
|   | 2. | 794 | 481 | 394 |
|   | 3. | 789 | 483 | 388 |
| 3 | 1. | 791 | 546 | 310 |
|   | 2. | 789 | 542 | 313 |
|   | 3. | 790 | 548 | 306 |
| 4 | 1. | 835 | 666 | 202 |
|   | 2. | 834 | 665 | 202 |
|   | 3. | 835 | 667 | 201 |
| 5 | 1. | 816 | 716 | 123 |
|   | 2. | 817 | 716 | 124 |
|   | 3. | 816 | 714 | 125 |
| 6 | 1. | 806 | 793 | 16 |
|   | 2. | 805 | 795 | 13 |
|   | 3. | 803 | 790 | 16 |

A linear relationship will be seen to exist if the optical densities of each of the specimens in Table I is plotted on a linear graph against the corresponding units of amylase. This linear relationship does not appear to exist when the units of amylase exceed approximately 600 units unless the specimen is further diluted. When an additional dilution is required, the resultant units of amylase should be multiplied by the dilution ratio to preserve the linearity of the test system. The microliter amounts of specimen used have the advantage of eliminating the possibility of non-specific substances found in some urines and serums reacting with the amylose-iodine complex.

Although the starch solution described hereinabove is preferred, the invention is not limited thereto but comprehends a wider range of solutions.

The buffer may vary in concentrations from 0.002M to about 2.0M and is not limited to $Na_2HPO_4$ and $KH_2PO_4$ but includes any composition which may be used as a buffer, such as, for example, potassium tetroxalate, potassium hydrogen phthalate, sodium hydrogen succinate and sodium succinate, sodium tetraborate, sodium bicarbonate, and sodium carbonate.

Any chloride salt producing chloride ions in aqueous solution may be substituted for sodium chloride used in the preferred reagent, and may be present in concentrations ranging from 0.001M to about 1M.

Mannitol is used as an excipient but any other material performing the same function may be used and may be present in concentrations from about 2 grams to about 500 grams per liter. The presence of the excipient is desirable when the starch solution is freeze dried because the excipient forms a matrix which allows the solids to dry properly and to be redissolved quickly.

Superlose 500 is the brand name of an amylosestarch-fraction manufactured by Stein-Hall Company of New York City. Superlose 500 is a white, granular material having a moisture content of about 10 percent, a pH of 7, and a film tensile strength in excess of 8,000 pounds per square inch. The viscosity of Superlose 500 in Brookfield cps at 150°F. is 185 for 14% solids, 55 for 10% solids, and 10 for 5% solids. At 75°F. the viscosity is 2,000 for 14% solids, 275 for 10% solids, and 30 for 5% solids. Superlose 500 is used in the preferred reagent because it dissolves almost instantly in water at room temperature in contrast to most starches which require some degree of agitation and/or heating before passing into solution. Superlose 500 is made from the amylose fraction of potato starch and contains no significant amount of the amylopectin fraction of starch. This is desirable because upon the addition of an iodine solution, amylopectin turns an indefinite red to amber color, whereas amylose turns a very definite blue in color. Accordingly, any other starch which will quickly dissolve in water and yield a definite blue color is contemplated by the invention.

In filtering the final starch solution, a 0.22 micron membrane filter used under sterile conditions has been found to give good results, but any other type filter may be utilized provided it will perform the same function and remove any contaminants or particulate matter.

The starch solution need not be freeze dried and may be used in its original aqueous form. Freeze drying, however, is preferred because it will prolong the stability and life of the starch reagent indefinitely, which, if left in an aqueous condition, would tend to deteriorate with the passage of time.

The preferred iodine reagent contains iodine, potassium iodide, potassium iodate and hydrochloric acid. This iodine reagent, however, is not limited to these particular materials but comprehends the use of any iodides or iodates that will assist in solubilizing the iodine and the use of any acid that will provide a final pH of about 2. The concentration of iodine may vary from 0.0002N to 0.020N. The acid concentration may vary from 0.002N to 1.0N, and the concentration of iodide or iodate may range from 0.05 to 50.0 grams per liter. It is preferred that the pH of the iodine reagent be maintained at 2 to 3 because it has been found that this particular range of pH will stop the action of the amylase on the starch and will result in a blue iodine-starch complex that will be stable for at least 24 hours. The iodine reagent is not limited to this particular range of pH, however, but comprehends any pH in the acid range which will immediately stop the amylase starch reaction and provide for a stable color complex.

The preferred method set forth hereinabove may also vary considerably and still be within the method contemplated by the instant invention inasmuch as a primary object of the method is to compare the change in optical density between a reacted and unreacted starch solution. The particular parameters set forth in the preferred embodiment, however, have been found to provide a method that is quick, uncomplicated and reliable.

In measuring and comparing the optical densities of the test tubes containing the specimen and the blank, there is a possibility of a flase comparison due to the fact that the blank does not contain any specimen which may effect the optical density in the test tube containing the specimen because of the presence of proteins and other substances in the specimen. Thus to equalize the system, it is preferred the same amount of specimen that was added to the specimen test tube is also added to the blank test tube but only after the iodine reagent has been added to the blank so there will be no amylase starch reaction in the blank.

If a specimen is urine rather than blood serum, it is preferred that the urine be diluted with distilled water at a ratio of about 1 part of urine to 5 parts of water, and the specimen prepared from the resultant dilution.

A conventional spectrophotometer is used to measure the optical densities of the blank and specimen, but a colorimeter or any other device which will perform the same function may be used as well.

While the particular embodiment of the invention chosen herein for purposes of the disclosure is at present considered to be preferred, it is to be understood that the invention is intended to cover all changes and modifications in the disclosed embodiments which fall within the spirit and scope of the invention.

We claim:

1. A solution of starch in distilled water for use with a prescribed iodine solution for determining the concentration of amylase, said solution comprised of the following:
    a. a buffer in a concentration of about 0.002M to about 2.0M, and having a pH between about 6 to about 8;
    b. a chloride salt in a concentration of about 0.001M to about 1M; and
    c. a starch in a concentration of about 0.3 to about 20.0 grams per liter, and consisting essentially of a starch that is readily soluble in water at room temperature and will produce a definite blue color upon the addition of an aqueous iodine solution thereto, said solution having a pH of about 7.0.

2. A freeze dried composition for use with a prescribed iodine solution for determining the concentration of amylase, said freeze dried composition prepared from the solution as set forth in claim 1 and having an excipient in a concentration of about 10 grams to about 500 grams per liter.

3. The starch solution of claim 1 wherein said buffer is disodium hydrogen phosphate in a concentration of about 0.025M and potassium dihydrogen phosphate in a concentration of about 0.025M, said chloride salt is NaCl in a concentration of about 0.025M, and said starch is present in a concentration of about 0.225 grams per liter, said solution containing mannitol in a concentration of about 10 grams per liter.

4. A freeze dried composition for use with a prescribed iodine solution for determining the concentration of amylase, said freeze dried composition prepared from the solution as set forth in claim 3 and having 10 grams per liter of mannitol.

* * * * *